United States Patent [19]

Roshinsky

[11] Patent Number: 4,909,558
[45] Date of Patent: Mar. 20, 1990

[54] EXTENDABLE LINER FOR PICKUP TRUCK BOXES

[75] Inventor: Mervin S. Roshinsky, Kelowna, Canada

[73] Assignee: Trax Industries Inc., New Westminster, Canada

[21] Appl. No.: 125,551

[22] Filed: Nov. 25, 1987

[30] Foreign Application Priority Data

Jun. 16, 1987 [CA] Canada ................................. 539799

[51] Int. Cl.⁴ ............................................ B60R 11/06
[52] U.S. Cl. .................................. 296/37.6; 312/334; 312/339
[58] Field of Search ............................... 296/37.6, 26; 312/334 X, 335, 339 X

[56] References Cited

U.S. PATENT DOCUMENTS

| | | | |
|---|---|---|---|
| 2,284,419 | 5/1942 | Greig | 296/26 |
| 2,545,269 | 3/1951 | Ford | 296/26 |
| 2,784,027 | 3/1957 | Temp | 296/37.6 |
| 3,203,749 | 8/1965 | Bullock et al. | 312/339 |
| 3,298,768 | 1/1967 | Vogt | 312/339 |
| 3,471,045 | 10/1969 | Panciocco | 296/37.6 |
| 3,701,577 | 10/1972 | Fischer | 312/339 |
| 4,197,600 | 4/1980 | Slabic | 296/167 |
| 4,469,364 | 9/1984 | Rafi-Zadeh | 296/37.6 |
| 4,573,731 | 3/1986 | Knaack et al. | 296/37.6 |
| 4,635,992 | 1/1987 | Hamilton et al. | 296/37.6 |
| 4,681,360 | 7/1987 | Peters et al. | 296/37.6 |
| 4,705,315 | 11/1987 | Cherry | 296/37.1 |

*Primary Examiner*—Robert R. Song
*Attorney, Agent, or Firm*—Bull, Housser & Tupper

[57] ABSTRACT

An extendable liner for a pickup truck box allows the load in the truck to be extended from the rear of the truck for easy access despite the presence of a cap over the box. The liner is supported and extended on a roller assembly. The roller assembly has a pair of tracks fixed to the liner, a pair of tracks fixed to the truck box, and a carriage assembly having a plurality of rollers, one set rides in the tracks fixed to the liner and one set rides in the tracks fixed to the truck.

14 Claims, 5 Drawing Sheets

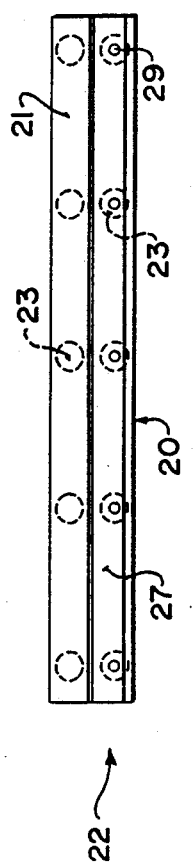
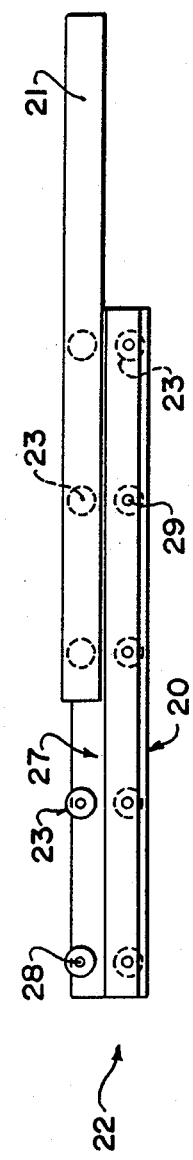
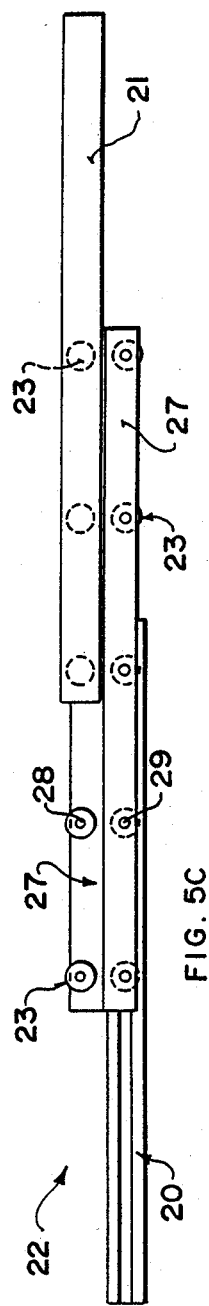
FIG. 5A
FIG. 5B
FIG. 5C

EXTENDABLE LINER FOR PICKUP TRUCK BOXES

BACKGROUND OF THE INVENTION

The invention relates to pickup trucks, which are vehicles having a load-carrying box behind the driver's cab. More particularly, the invention relates to an extendable liner for a pickup truck box. Pickup trucks are vehicles designed for carrying small to medium size loads in an open bed or box which is located behind the driver's cab. As the box opens upwardly, it is readily accessible from the exterior of the vehicle for the loading and unloading of objects and materials.

Recently, caps for pickup trucks have become popular. These caps are fiberglass covers which enclose the pickup truck box so that it may be used as a camper. Typically the cap is installed on the box for extended periods. As a result, it becomes difficult to load and unload the pickup truck box. It is necessary for a person to climb into the box and crawl under the cap in order to retrieve objects or materials which are stored in the pickup truck box.

One solution to this problem has been to provide a moveable tool box which runs on casters so that it can be moved from the front of the pickup truck box to the rear for easier access. Such a moveable tool box is shown in U.S. Pat. No. 4,635,992 issued to Hamilton et al. on Jan. 13, 1987. This is a suitable solution for the storage of tools, but does not solve the problem for other types of loads. Drawer-like arrangements for pickup truck boxes are shown in U.S. Pat. No. 4,573,731 issued Mar. 4, 1986 to Knaack and U.S. Pat. No. 2,784,027 issued Mar. 5, 1957 to Temp. The purpose of these arrangements, however, is to provide an orderly storage unit beneath a false floor of the box. These drawers are not adapted for storing or supporting the heavy loads for which the pickup truck box itself is designed to carry.

The present invention provides an extendable liner for a pickup truck box which allows the complete load from the pickup truck box to be extended from the rear of the pickup truck for easy access. The invention includes a liner which slides horizontally in, and extends from the pickup truck box. The liner is supported on a three part roller assembly. The roller assembly includes a central pair of carriages on which are mounted a plurality of rollers, a first pair of tracks which are secured to the pickup truck box and a second pair of tracks which are secured to the liner.

BRIEF DESCRIPTION OF THE DRAWINGS

In drawings which illustrate an embodiment of the invention:

FIG. 3a and FIG. 3b are perspective views showing cooperating relationship of a roller carriage with respect to upper and lower tracks.

FIGS. 5a, 5b and 5c are schematic drawings illustrating the operation of the roller assembly of the invention.

DETAILED DESCRIPTION OF AN EMBODIMENT OF THE INVENTION

Figure 1:
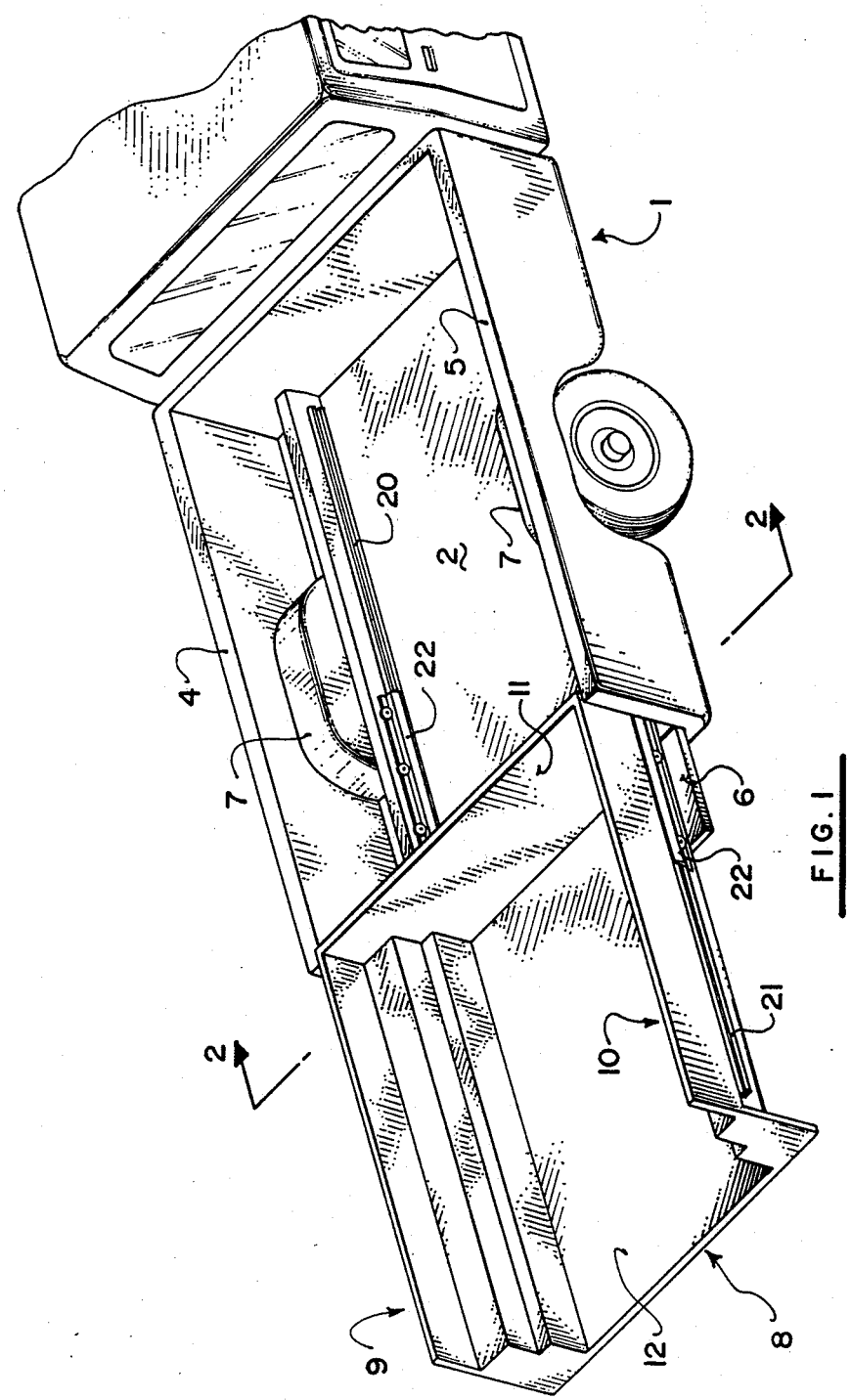
FIG. 1 is a perspective view showing the extendable liner of the invention in a pickup truck body in extended position.

Referring to FIG. 1, a standard pickup truck, indicated by numeral 1, has a bed or box 2 and a cab 3. Box 2 has upstanding sides 4 and 5, and a tailgate 6 which may be lowered to provide an open end to the box 2. Typically the pickup truck box will also have wheel wells 7 extending into the box.

The extendable liner of the invention is designated as 8. It has stepped sides 9 and 10, front wall 11 and floor 12.

Figure 2:
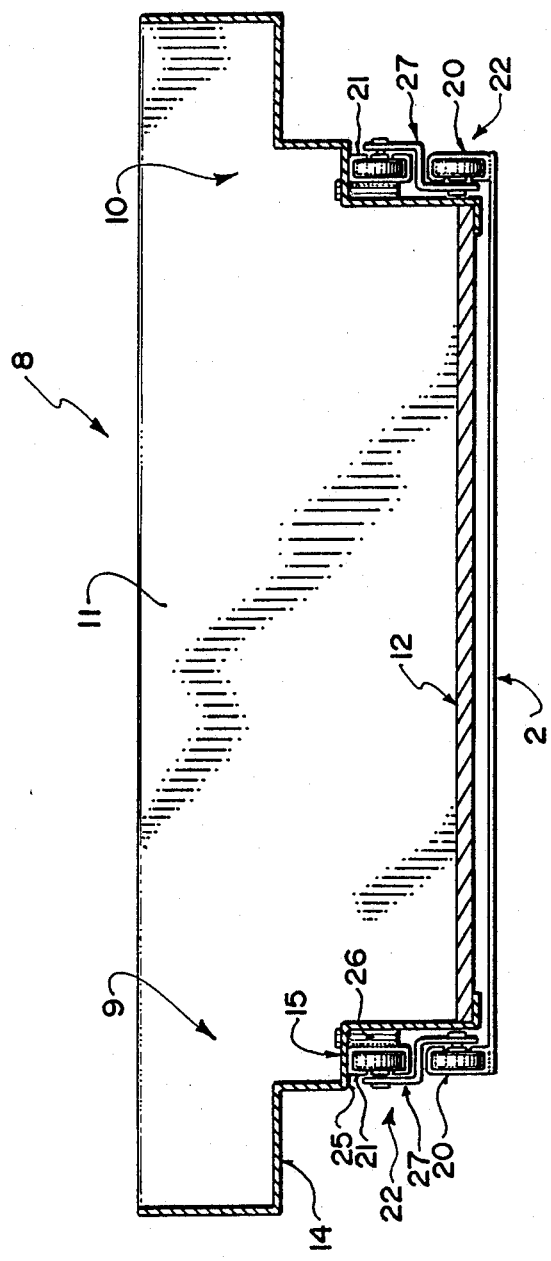
FIG. 2 is a cross-sectional view taken along line II—II of FIG. 1.
Figure 3:
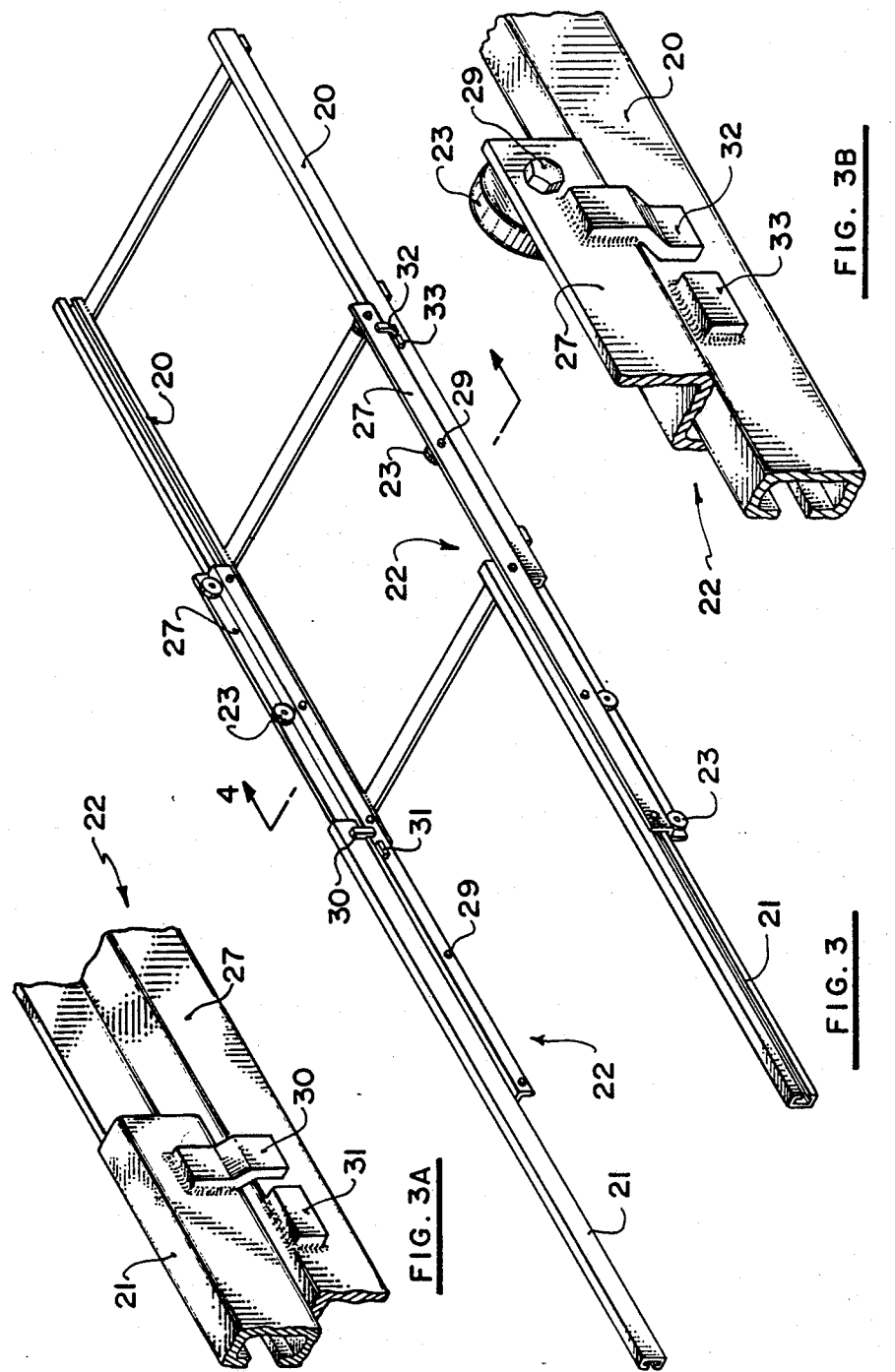
FIG. 3 is a perspective view showing the operation of a roller assembly of the invention.
Figure 4:
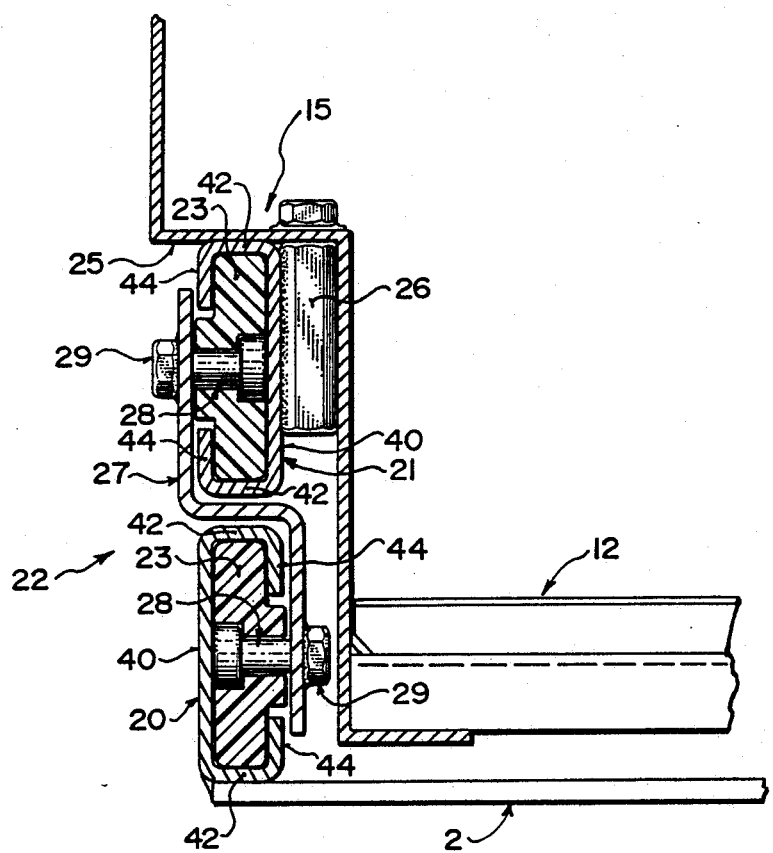
FIG. 4 is a cross-sectional view taken along line IV—IV of FIG. 3.

As shown in further detail in FIG. 2, liner 8 has two stepped portions, a first stepped portion 14 to allow the liner to clear the wheel wells, and a second stepped portion 15 to receive the roller assembly of the invention.

The roller assembly is shown in further detail in FIGS. 2 through 5. It consists of a lower roller track 20, an upper roller track 21, and a central carriage assembly 22. Roller tracks 20 and 21 are C-shaped in cross-section to receive nylon rollers or casters 23. Roller tracks 20 and 21 include vertically-oriented web portion 40, horizontally-oriented rail portion 42 extending laterally from web portion 40 and vertically-oriented flange portion 44 extending from each rail portion 42 opposite web portion 40. Roller tracks 20 and 21 receive rollers 23 between opposed rail portions 42. Track 20 is welded or otherwise fixed to the floor 2 of the pickup truck box. Track 21 is fixed to the underside of liner 8, along surface 25 of step 15. It opens in the opposite direction from track 20. It is fixed to the liner by means of splice nuts 26 to which it is welded.

A central roller carriage assembly consists of an S-shaped plate 27 on which are mounted ten nylon rollers. The rollers have steel bushings 28 and are mounted for rotation and are secured to the carriage by nuts 29. On each carriage assembly, five nylon rollers face inwardly to roll along track 21, while a further five rollers face outwardly to roll along track 20.

The manner in which the roller assembly extends is shown in FIG. 5. In the non-extended position, the liner rests completely within the pickup truck box and is kept in place by closing the tail gate. In this position, carriage assembly 22 is in alignment with both tracks 20 and 21. To extend the liner, the tail gate is lowered, and the liner is pulled out from the pickup truck box. Initially, track 21 will roll outwardly on the upper bank of rollers on the carriage assembly. Once the upper track 21 has extended half of its length, a stopper 30, shown in FIG. 3a, which is mounted on track 21 strikes a stopper 31 on the central carriage to prevent further extension of the upper track with respect to the carriage. At that point, the central carriage commences to extend relative to lower track 20 which is fixed on the floor 2 of the box. The central carriage rolls outwardly on lower track 20 until stopper 32 shown in FIG. 3b strikes stopper 33 on lower track 20, at which point the liner is fully extended. Such stoppers may be formed of rectangular members secured to the tracks as shown. In this way, the liner can be extended while still carrying considerable weight.

Nylon rollers are preferred for the rollers in the carriage assembly, with steel bushings. The liner may be constructed of a plywood floor and metal sides, or such other suitable materials as will be apparent to those skilled in the art.

A locking mechanism may also be used to secure the liner in a retracted position. For example, a spring-loaded bolt may be provided on the liner which is biased to engage an opening in the pickup truck box when the liner is retracted. The bolt would serve to secure the liner in place until it is retracted from the opening by pulling a connected ring or handle to compress the spring.

The roller carriage of the assembly may be used to extend and retract other heavy objects. For example, an extendable bumper on a truck, for use in conjunction with a camper, could be mounted on the roller carriage assembly described above for extension and retraction. A liner for the luggage storage compartments of buses could also be modified to extend for easy access using the roller carriage assembly described above. Similarly, an overhead crane would be extended and retracted using the roller carriage assembly of the invention.

While the rollers have been shown as being mounted in the intermediate roller carriage 22 it will be apparent to those skilled in the art that the roller may be mounted on the liner and truck body tracks 20 and 21 respectively with the intermediate carriage having tracks for rolling on these rollers.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

1. In a vehicle having a storage area with upstanding sides and open at one end, the improvement consisting of an extendable liner comprising:
   (a) a rigid liner having two upstanding, parallel, vertical sides and a floor extending between said sides, said liner being adapted to slide horizontally within said storage area; and
   (b) means for supporting and extending said liner from said open end of said storage area and supporting said liner in an extended position, said extending and supporting means comprising:
      (i) a first pair of roller tracks in parallel spaced relationship fixed relative to said storage area;
      (ii) a second pair of roller tracks fixed in parallel spaced relationship, each said second roller track being fixed to opposite outer vertical surfaces of said upstanding sides of said rigid liner;
      (iii) a pair of roller carriages having mounted thereon a plurality of rollers and adapted for rolling in said first and second roller tracks, each said roller carriage comprising a first vertical surface having mounted on the interior surface thereof a plurality of horizontally-spaced rollers adapted for rolling in said first roller tracks, and a second vertical surface vertically-spaced from said first vertical surface and having mounted thereon a plurality of rollers adapted for rolling in said second roller tracks.

2. The improvement of claim 1 further comprising stop means to prevent said second roller track from extending more than a predetermined portion of their length beyond the ends of said carriages.

3. The improvement of claim 2 further comprising stop means to prevent said carriages from extending more than a predetermined portion of their length beyond the end of said first roller tracks.

4. The improvement of claim 1 wherein each of said roller carriages comprises four rollers.

5. The improvement of claim 1 wherein each of said roller carriages comprises six rollers.

6. The improvement of claim 2 wherein each of said roller carriages comprises four rollers.

7. The improvement of claim 3 wherein each of said roller carriages comprises four rollers.

8. The improvement of claim 2 wherein each of said roller carriages comprises six rollers.

9. The improvement of claim 3 wherein each of said roller carriages comprises six rollers.

10. The improvement of claim 1 wherein said first and second vertical surfaces of said roller carriages face in opposite directions.

11. The improvement of claim 1 wherein each of said first and second pairs of roller tracks has a C-shaped cross-section, comprising a web portion having a pair of opposed rail portions extending therefrom to receive the rollers there between, each rail portion having respective flange portions extending therefrom inwardly towards each other.

12. The improvement of claim 11 further comprising means for mounting said plurality of rollers to said interior surfaces wherein the distance between said flange portions is just large enough to permit said means to move between said flange portions.

13. The improvement of claim 12 wherein each longitudinal end of said pair of roller carriage is adjacent the end of one of said flange portions on adjacent roller tracks and wherein said ends of each said roller carriages extends outwardly beyond the ends of said adjacent flange portion.

14. The improvement of claim 11 wherein the distance between said web portion and said flange portion is slightly larger than the width of said rollers.

* * * * *